United States Patent
Angot et al.

(10) Patent No.: US 9,894,255 B2
(45) Date of Patent: Feb. 13, 2018

(54) METHOD AND SYSTEM FOR DEPTH SELECTIVE SEGMENTATION OF OBJECT

(71) Applicant: INDUSTRIAL TECHNOLOGY RESEARCH INSTITUTE, Hsinchu (TW)

(72) Inventors: Ludovic Angot, Hsinchu (TW); Chun-Te Wu, Taoyuan County (TW); Wei-Yi Lee, Tainan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 365 days.

(21) Appl. No.: 14/290,126

(22) Filed: May 29, 2014

(65) Prior Publication Data

US 2014/0368661 A1    Dec. 18, 2014

Related U.S. Application Data

(60) Provisional application No. 61/835,672, filed on Jun. 17, 2013.

(51) Int. Cl.
*H04N 5/30* (2006.01)
*H04N 5/225* (2006.01)
(Continued)

(52) U.S. Cl.
CPC ............ *H04N 5/2256* (2013.01); *G06T 7/11* (2017.01); *G06T 7/136* (2017.01); *G06T 7/174* (2017.01);
(Continued)

(58) Field of Classification Search
None
See application file for complete search history.

(56) References Cited

U.S. PATENT DOCUMENTS

| | | | |
|---|---|---|---|
| 5,923,380 A | * | 7/1999 | Yang .............. G03B 17/53 348/586 |
| 7,693,331 B2 | | 4/2010 | Porikli et al. |

(Continued)

FOREIGN PATENT DOCUMENTS

| | | |
|---|---|---|
| CA | 2667066 A1 | 11/2010 |
| CN | 101931826 A | 12/2010 |
| TW | 200539055 A | 12/2005 |
| TW | 201039047 A | 11/2010 |
| TW | 201225637 A | 6/2012 |

OTHER PUBLICATIONS

Chéné et al. ("On the use of depth camera for 3D phenotyping of entire plants", Computers and Electronics in Agriculture vol. 82, Mar. 2012, pp. 122-127).*

(Continued)

*Primary Examiner* — Dakshesh Parikh
(74) *Attorney, Agent, or Firm* — Rabin & Berdo, P.C.

(57) ABSTRACT

A method and a system for depth selective segmentation of an object are provided. The method comprises the following steps. An image is captured in an invisible domain of the optical spectrum by illuminating a scene of interest under an illumination corresponding to said invisible domain of the optical spectrum by an invisible light illumination unit. A binary mask is obtained from the image according to a threshold. Part of the image is eliminated by applying the binary mask to the image, and resulting in another image. The threshold is changed and another binary mask is obtained. The latest obtained binary mask is applied to the latest captured image. The step of changing of the threshold, the step of obtaining a mask and the step of applying the latest obtained binary mask on the latest captured image are performed at least once.

22 Claims, 17 Drawing Sheets

(51) Int. Cl.
  *H04N 5/235*   (2006.01)
  *H04N 5/33*   (2006.01)
  *G06T 7/11*   (2017.01)
  *G06T 7/174*   (2017.01)
  *G06T 7/136*   (2017.01)

(52) U.S. Cl.
  CPC ............ *H04N 5/2354* (2013.01); *H04N 5/332* (2013.01); *G06T 2207/10016* (2013.01); *G06T 2207/10048* (2013.01); *G06T 2207/10144* (2013.01)

(56) References Cited

U.S. PATENT DOCUMENTS

| 2003/0137593 | A1* | 7/2003 | Watanabe | G06K 9/00651 |
| | | | | 348/274 |
| 2010/0302376 | A1 | 12/2010 | Boulanger et al. | |
| 2012/0098797 | A1* | 4/2012 | Oh | G06F 1/3203 |
| | | | | 345/175 |
| 2012/0162370 | A1 | 6/2012 | Kim et al. | |
| 2012/0206458 | A1 | 8/2012 | El Dokor | |
| 2012/0229650 | A1* | 9/2012 | Matthews | G06K 9/6289 |
| | | | | 348/164 |

OTHER PUBLICATIONS

Yajun Fang et al., "A Shape-Independent Method for Pedestrian Detection With Far-Infrared Images" IEEE Transactions on Vehicular Technology, (vol. 53 , Issue: 6 ), pp. 1679-1697, Nov. 2004.

Christopher Eveland et al., "Background Modeling for Segmentation of Video-Rate Stereo Sequences" 1998 IEEE Computer Society Conference on Computer Vision and Pattern Recognition, pp. 266-271, Jun. 1998.

C.O. Conaire et al., "Background Modeling in Infrared and Visible Spectrum Video for People Tracking" IEEE Computer Society Conference on Computer Vision and Pattern Recognition—Workshops, 2005. CVPR Workshops, Jun. 2005.

Neven Santrac et al. "High Resolution Segmentation with a Time-of-Flight 3D-Camera using the Example of a Lecture Scene" Freie Universitat Berlin, Department of Mathematics and Computer Science, B-06-09, Sep. 2006.

Nir Friedman et al., "Image Segmentation in Video Sequences: A Probabilistic Approach" Proceedings of the Thirteenth Conference Annual Conference on Uncertainty in Artificial Intelligence (UAI-97), pp. 175-181, 1997.

Taiwanese Office Action dated Mar. 21, 2016.

* cited by examiner

METHOD AND SYSTEM FOR DEPTH SELECTIVE SEGMENTATION OF OBJECT

This application claims the benefit of U.S. provisional application Ser. No. 61/835,672, filed Jun. 17, 2013, the disclosure of which is incorporated by reference herein in its entirety.

TECHNICAL FIELD

This disclosure relates in general to a method and a system for depth selective segmentation of an object.

BACKGROUND

The advent of mobile imaging, such as mobile devices integrating cameras, came with the development of several imaging applications: refocusing, special effects calling for various image processing filters. It would be desirable to obtain the segmentation of an object using a compact system at a low computation cost. Furthermore, it would be desirable to obtain a depth selective segmentation where several objects can be individually isolated from one another and from the background. Such depth selective segmentation could be used for example in a man-machine interaction device. It is a subject of the present disclosure to provide a depth selective segmentation of objects in a scene.

SUMMARY

This disclosure is directed to a method and a system for depth selective segmentation of an object.

According to one embodiment, a method for depth selective segmentation of an object is provided. The method comprises the following steps. An image is captured in an invisible domain of the optical spectrum by illuminating a scene of interest under an illumination corresponding to the invisible domain of the optical spectrum by an invisible light illumination unit. A binary mask is obtained from the captured image according to a threshold. Part of the captured image is eliminated by applying the binary mask to the captured image, resulting in another image. The threshold is changed and another binary mask is obtained. The latest captured binary mask is applied to the latest obtained image. The step of changing the threshold, the step of obtaining another mask and the step of applying the latest obtained binary mask on the latest captured image can be iterated.

According to another embodiment, a system for depth selective segmentation of an object is provided. The system includes an invisible light illumination unit, an image capturing unit and a processing unit. The image capturing unit is capable of capturing an image in an invisible domain of the optical spectrum. The processing unit is used for obtaining a binary mask from the image captured in the invisible domain of the optical spectrum according to a threshold. The processing unit eliminates part of the image captured in the invisible domain of the optical spectrum by applying the binary mask to result in a new image. The processing unit further changes the threshold and obtains another binary mask from the latest obtained image according to the changed threshold.

According to an alternative embodiment, a method for depth selective segmentation of an object is provided. The method comprises the following steps. An image is captured in an invisible domain of the optical spectrum by illuminating a scene of interest under an illumination corresponding to the invisible domain of the optical spectrum according to an exposure setting, wherein the illumination is provided by an invisible light illumination unit according to a light intensity. A binary mask is obtained from the captured image. The light intensity or the exposure setting is changed. Another image is captured in the invisible domain of the optical spectrum according to the changed light intensity or the changed exposure setting. Part of the latest captured image is eliminated by using the binary mask. In the step of obtaining the binary mask, another binary mask is obtained from the latest image in which part has been eliminated.

According to another embodiment, a system for depth selective segmentation of an object is provided. The system comprises an invisible light illumination unit, an image capturing unit capable of capturing image in an invisible domain of the optical spectrum and a processing unit. The image capturing unit is used for capturing an image in an invisible domain of the optical spectrum according to an exposure setting. The processing unit is used for obtaining a binary mask from the captured image according to a threshold and used for changing the light intensity or the exposure setting. The image capturing unit captures another image in an invisible domain of the optical spectrum according to the changed light intensity or the changed exposure setting. The processing unit eliminates part of the latest captured image by using the binary mask and obtains another binary mask from the image in which parts have been eliminated.

Figure 1:
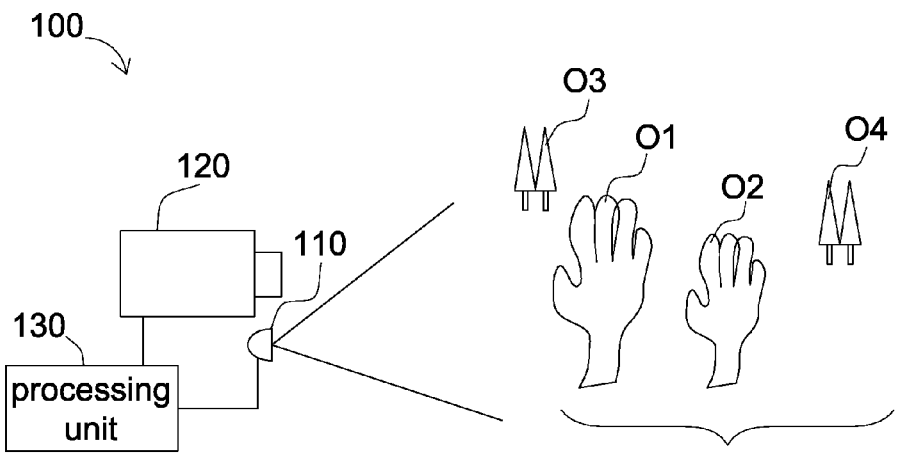
FIG. 1 shows a system for depth selective segmentation of an object.

In the following detailed description numerous specific details are set forth in order to provide a thorough understanding of the disclosed embodiments. It will be apparent, however, that one or more embodiments may be practiced without these specific details. In some instances, well-known structures and devices are schematically shown in order to simplify the drawing.

DETAILED DESCRIPTION

Figure 2:
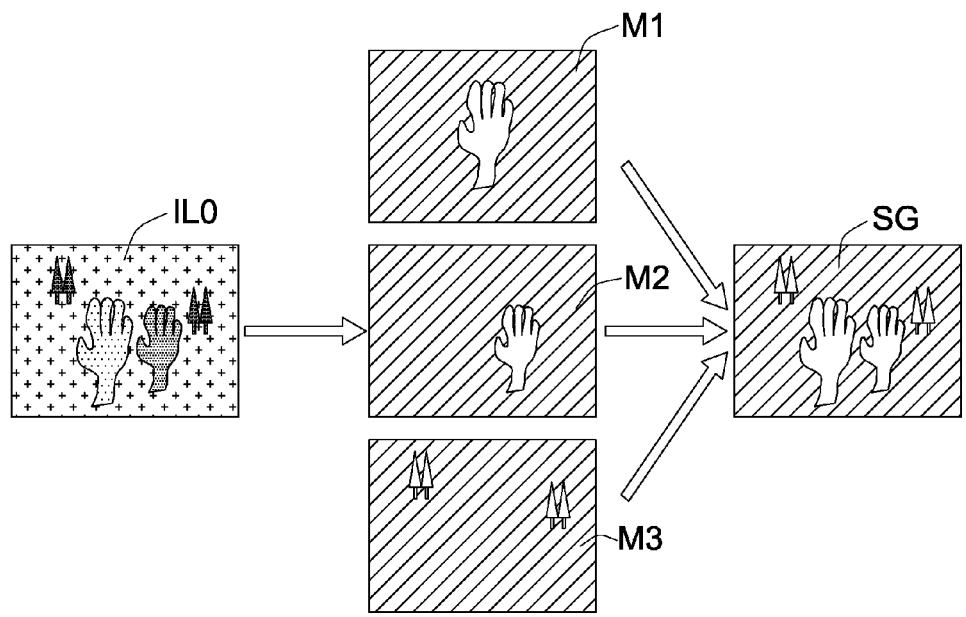
FIG. 2 shows an image captured in an invisible domain of the optical spectrum and a plurality of binary masks.

Referring to FIGS. 1 and 2, FIG. 1 shows a system 100 for depth selective segmentation of an object, and FIG. 2 shows an image IL0 captured in an invisible domain of the optical spectrum and a plurality of binary masks M1 to M3. The system 100 includes an invisible light illumination unit 110, an image capturing unit 120 capable of capturing images in an invisible domain of the optical spectrum and a processing unit 130.

The invisible light illumination unit 110 is used for providing for example infrared (IR) light, ultra violet (UV) light or a mix of IR light and UV light. The invisible light illumination unit 110 may be a device or a circuit comprising an invisible light emitter, a reflector, a diffuser, a lens set and a power source. The invisible light emitter may be a LED or a laser emitter. The reflector is used for reflecting the invisible light toward the object. The diffuser is used for diffusing the invisible light, so that the invisible light is uniform. The lens set may be used to additionally focus the invisible light on the object.

The image capturing unit 120 is used for capturing the image IL0 (shown in FIG. 2) in the invisible domain of the optical spectrum. For example, the image capturing unit 120 may be a camera including a lens module and a sensor with sensitivity in the invisible light corresponding to the invisible light of the invisible light illumination unit 110. The lens module is used for focusing the reflected invisible light on the sensor. The sensor is used for sensing the intensity of the reflected invisible light.

The processing unit 130 is used for performing several processing procedures or several calculating procedures. For example, the processing unit 130 may be a circuit, a chip, or a media storage performing a plurality of program codes.

Referring to FIG. 1, a plurality of objects O1, O2, O3 and O4 are disposed in front of the system 100. The system 100 can be used for depth selective segmentation of any of the objects O1, O2, O3 and O4. For example, referring to FIG. 2, the system 100 forms the binary masks M1 to M3 corresponding to objects having different depth from image IL0. Then, the binary masks M1 to M3 can be combined to obtain a segmented image SG representing different depths. A matting operation can then be performed on the segmented objects providing that a visible light of the object is available.

Figure 3A:
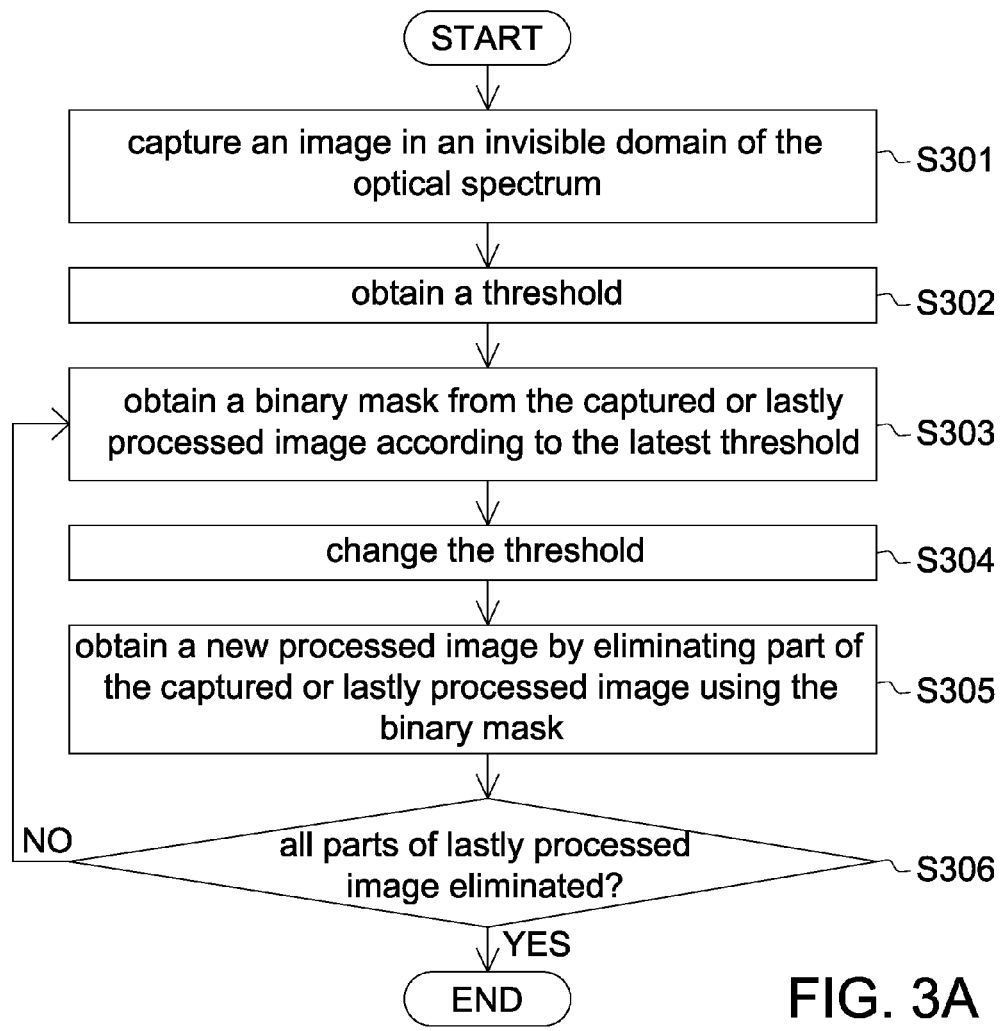
FIG. 3A shows a flow chart of a method for depth selective segmentation of an object.
Figure 3B:
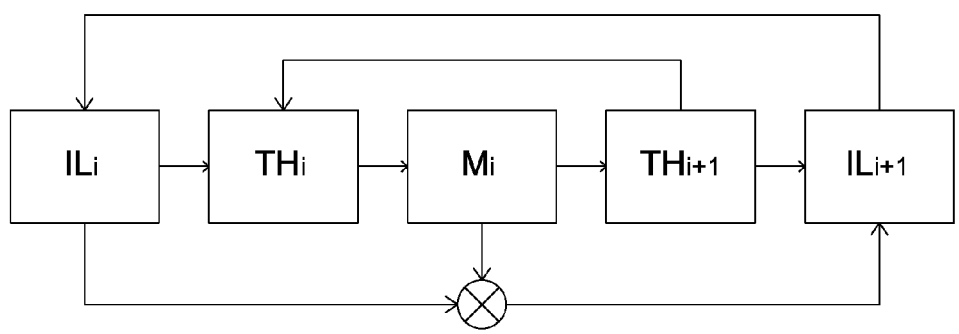
FIG. 3B shows a process cycle corresponding to the flow chart of FIG. 3A.
Figure 4:
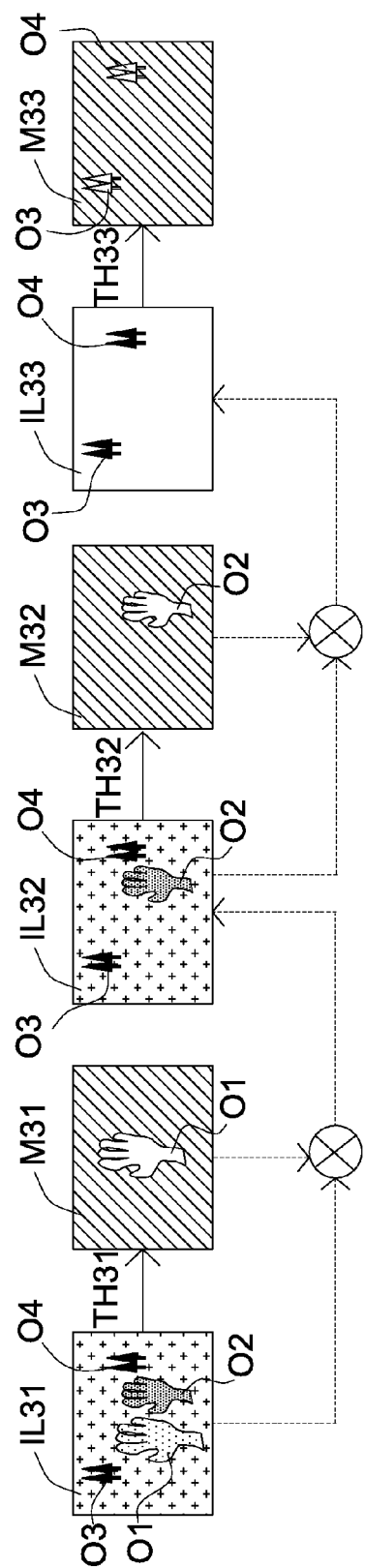
FIG. 4 shows an example of the steps in FIGS. 3A and 3B.

Referring to FIGS. 3A, 3B and 4, FIG. 3A shows a flow chart of a method for depth selective segmentation of an object, FIG. 3B shows a process cycle corresponding to the flow chart of FIG. 3A, and FIG. 4 shows an example of the steps described in FIGS. 3A and 3B.

In step S301, an image ILi is captured in an invisible domain of the optical spectrum by the image capturing unit 120 when a scene composed of objects is illuminated by the invisible light illumination unit 110. For example, an image IL31 including the objects O1, O2, O3 and O4 is captured.

In step S302 a threshold THi is obtained. For example, a threshold TH31 is selected. The threshold can be obtained from a calibration stage, where objects of given reflectance and illuminated by a given invisible light illumination are located at known distances against a dark background, and appropriate thresholds are determined according to the distance, the thresholds are such as to obtain binary masks of the object at various distances.

In step S303, an $i^{th}$ binary mask Mi is obtained from the image ILi according to the $i^{th}$ threshold THi by the processing unit 130. First binary mask M1 is obtained from image IL1 captured in the invisible domain of the optical spectrum and subsequent binary masks M2, M3 . . . are obtained from processed images as will be describe in the next steps. The binary mask Mi may consist of pixels values of "1" and "0", with "1" being used to preserve regions of interest and "0" being used to eliminate other regions of the image.

For example, referring to FIG. 4, a binary mask M31 is obtained from the image IL31 according to a threshold TH31. Because the object O1 is the nearest object, it receives more invisible light than the objects O2, O3 and O4. By setting the suitable threshold TH31, the region of the image corresponding to object O1 can be preserved in the binary mask M31 while the region of the image corresponding to objects O2, O3 and O4 can be filtered out from the binary mask M31. The threshold TH31 can be obtained by means of a calibration of the system.

In step S304, the threshold THi is changed to a threshold THi+1 by the processing unit 130. In this step, the threshold THi is decreased to a threshold THi+1. For example, the threshold TH31 is decreased to the threshold TH32.

In step S305, part of the image ILi is eliminated by using the binary mask Mi, resulting in an image ILi+1. For example, part of the image IL31 is eliminated by using the binary mask M31, resulting in an image IL32 where the object O1 is eliminated and the objects O2, O3 and O4 are preserved.

Afterwards, the process goes back to step S303. For example, another binary mask M32 is obtained from the image IL32 according to threshold TH32.

Then, in step S304, the threshold TH32 is decreased to be a threshold TH33. Afterwards, in step S305, part of the image IL32 is eliminated by using the binary mask M32 resulting in an image IL33 where the object O2 is eliminated and the objects O3 and O4 are preserved.

Then, the process goes back to the step S303, a binary mask M33 is obtained from the image IL33 according to the threshold TH33.

The process can be terminated at step S306 by testing if the binary mask contains only zeros for example, or contains isolated patches of pixels not relevant to a content of interest in the image. Thus the latest image contains no more part of interest to be eliminated. Parts to be eliminated can be selected based on arbitrary sizes so that only parts larger than a given size are considered of interest, smaller parts are considered as noise.

Based on the above steps, the binary masks Mi corresponding to different depths can be obtained by changing the threshold THi.

Figure 5A:
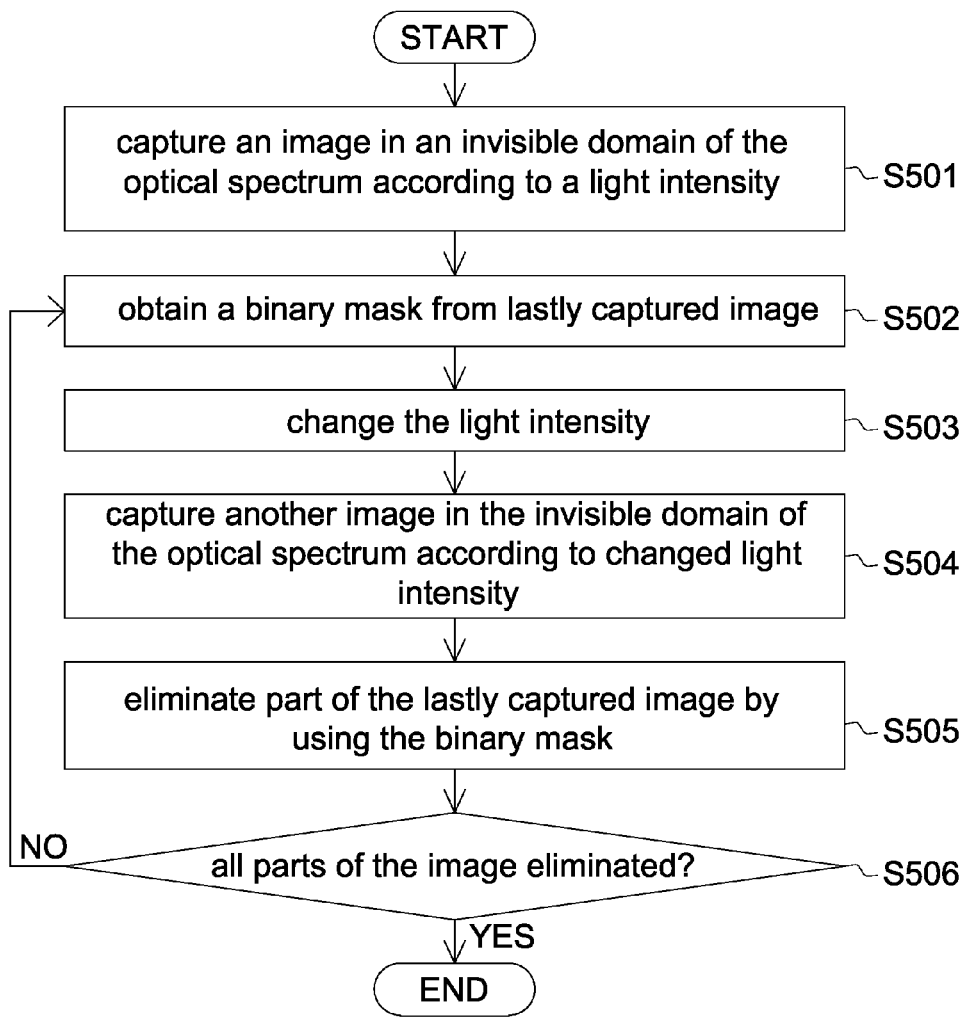
FIG. 5A shows a flow chart of another method for depth selective segmentation of an object.
Figure 5B:
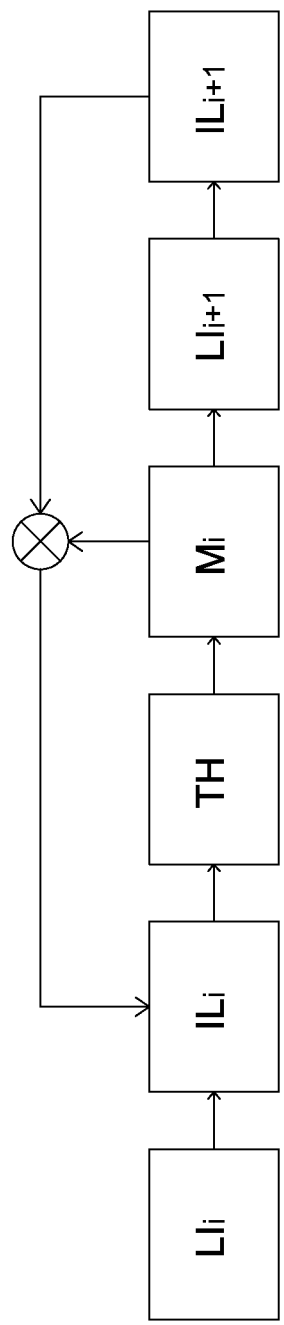
FIG. 5B shows a process cycle corresponding to the flow chart of FIG. 5A.
Figure 6:
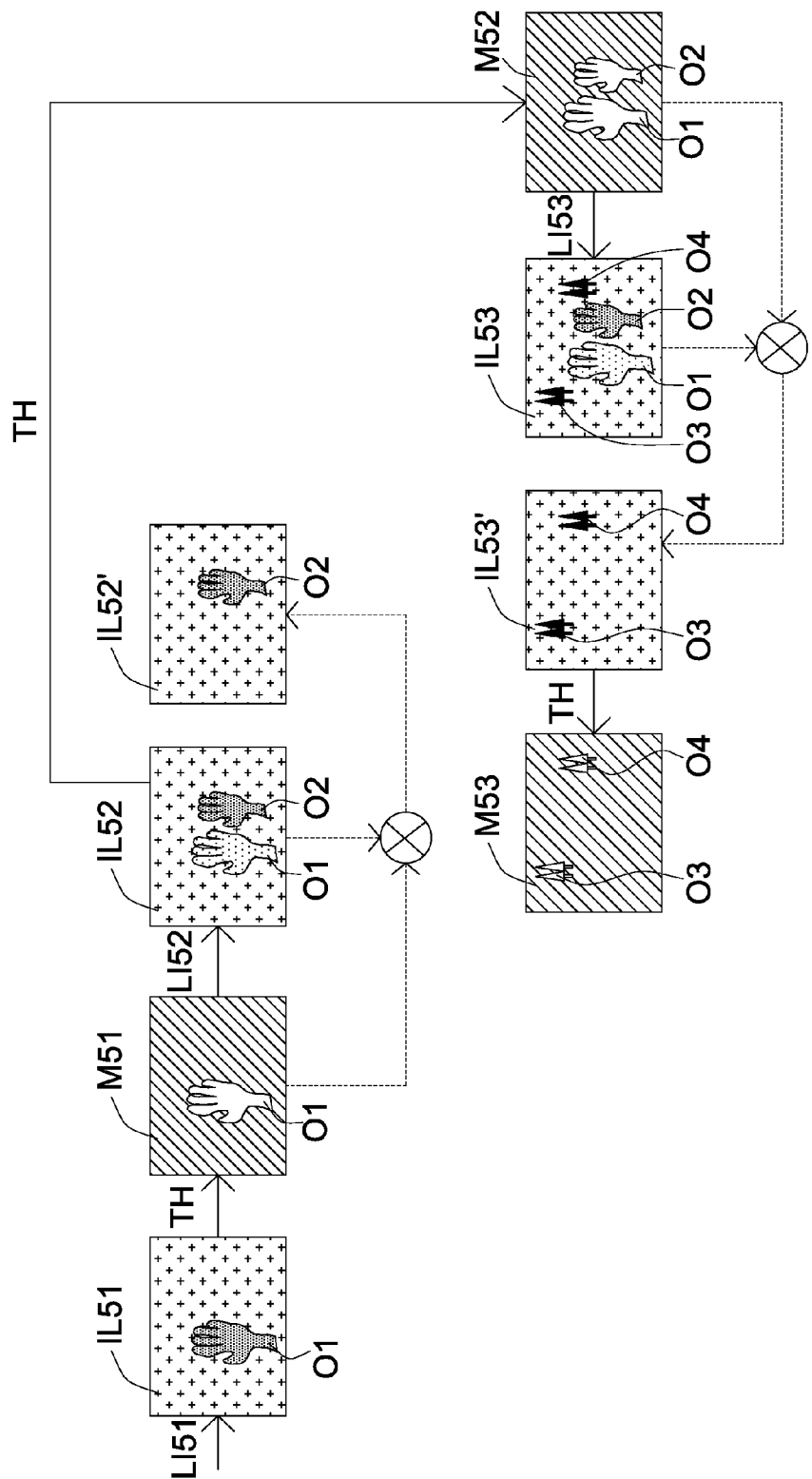
FIG. 6 shows an example of the steps in FIGS. 5A and 5B.

Referring to FIGS. 5A, 5B and 6, FIG. 5A shows a flow chart of another method for depth selective segmentation of an object, FIG. 5B shows a process cycle corresponding to FIG. 5A, and FIG. 6 shows an example of the steps in FIGS. 5A and 5B.

In step S501, an $i^{th}$ image ILi is captured by the image capturing unit 120 when a scene composed of objects is illuminated by the invisible light illumination unit 110 with a light intensity LIi. For example, an image IL51 including the object O1 is captured when the scene is illuminated by an invisible light with a light intensity LI51. By setting the suitable light intensity LI51, only the nearest object O1 receives a significant illumination, given a set of camera setting, such as exposure, gain, shutter speed, such that the object O1 is captured and the other objects O2, O3 and O4 are filtered out.

In step S502, an $i^{th}$ binary mask Mi is obtained from the $i^{th}$ image ILi according to a fixed threshold TH. The binary mask may consist of pixels value of "1" and "0", with "1" being used to preserve regions of interest and "0" being used to eliminate other regions of the image. For example, a binary mask M51 is obtained from the image IL51. By setting a suitable threshold TH, a set of objects in the foreground of the scene can be preserved in the binary mask Mi and the background can be filtered out.

In step S503, the light intensity LIi is changed to be a light intensity LIi+1. In this step, the light intensity LIi is increased to the light intensity LIi+1. For example, the light intensity LI51 is increased to a light intensity LI52.

In step S504, another image ILi+1 is captured according to the changed light intensity LIi+1. For example, an image IL52 is captured according to the changed light intensity LI52. By setting the suitable light intensity LI52, the objects O1 and O2 can be captured and the objects O3 and O4 will not be captured.

In step S505, part of the latest captured image ILi+1 is eliminated by using the binary mask Mi. For example, part of the image IL52 is eliminated by using the binary mask M51 resulting in an image IL52' where the object O1 is eliminated and the object O2 is preserved.

Afterwards, the process goes back to step S502. For example, another binary mask M52 is obtained from the image IL52. In one embodiment, another binary mask where only the object O2 is preserved can be obtained from the image IL52'.

Then, in step S503, the light intensity LI52 is increased to be a light intensity LI53.

Afterwards, in step S504, an image IL53 is captured under the changed light intensity LI53. By setting the suitable light intensity LI53, the objects O1 to O4 can be captured.

Then, in step S505, part of the image IL53 is eliminated by using the binary masks M52 resulting in an image IL53' where the objects O1 and O2 are eliminated and the objects O3 and O4 preserved. In another embodiment, after obtaining the first image IL52', another binary mask (not shown) where only the object O2 is preserved can be obtained from the first image IL52', and part of the first image IL53 can be eliminated by using the binary mask M51 where only the object O1 is preserved and the binary mask (not shown) where only the object O2 is preserved resulting in the first image IL53' where the objects O1 and O2 are eliminated and the objects O3 and O4 preserved.

Afterwards, the process goes back to step S502. Another binary mask M53 where only the objects O3 and O4 are preserved is obtained from the image IL53'.

The process can be terminated at step S506 by testing if the binary mask contains only zeros for example, or contains isolated patches of pixels not relevant to a content of interest in the image. Thus the latest image contains no more part of interest to be eliminated. Parts to be eliminated can be selected based on arbitrary sizes so that only parts larger than a given size are considered of interest, smaller parts are considered as noise.

Based on above, the binary masks Mi having different depths can be obtained by changing the light intensity LIi.

Figure 7A:
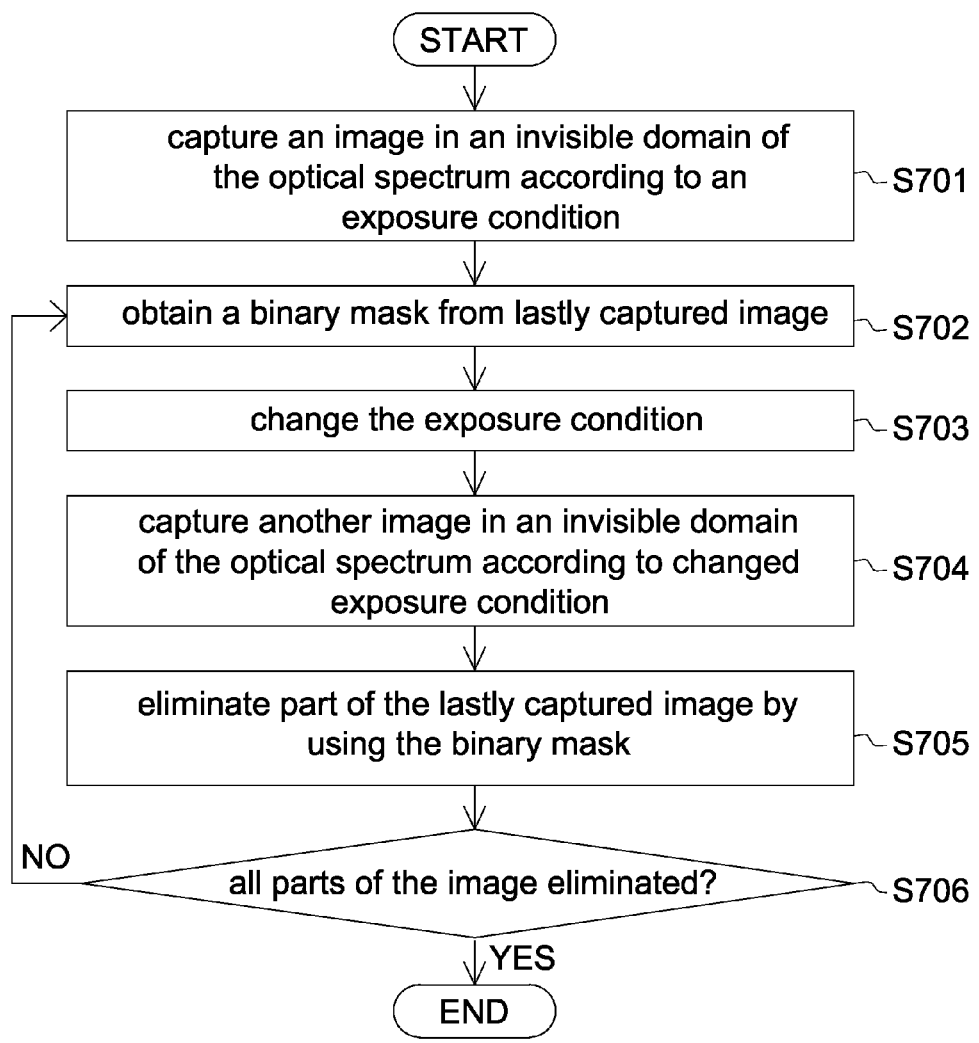
FIG. 7A shows a flow chart of another method for depth selective segmentation of an object.
Figure 7B:
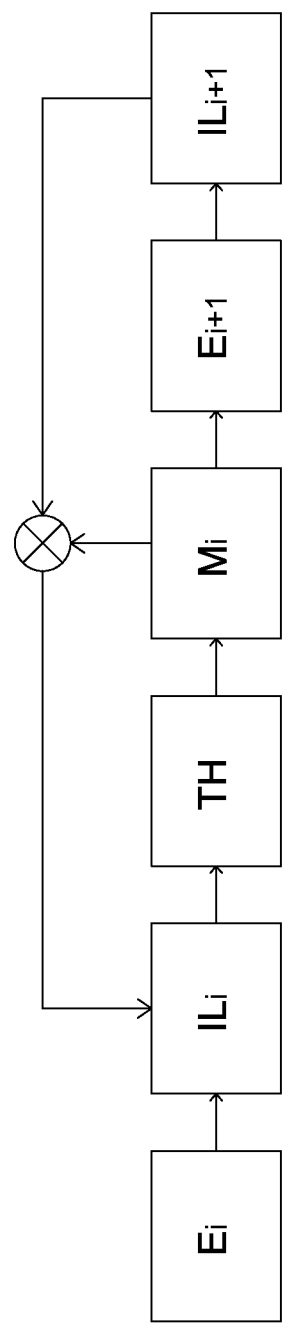
FIG. 7B shows a process cycle corresponding to the flow chart of FIG. 7A.
Figure 8:
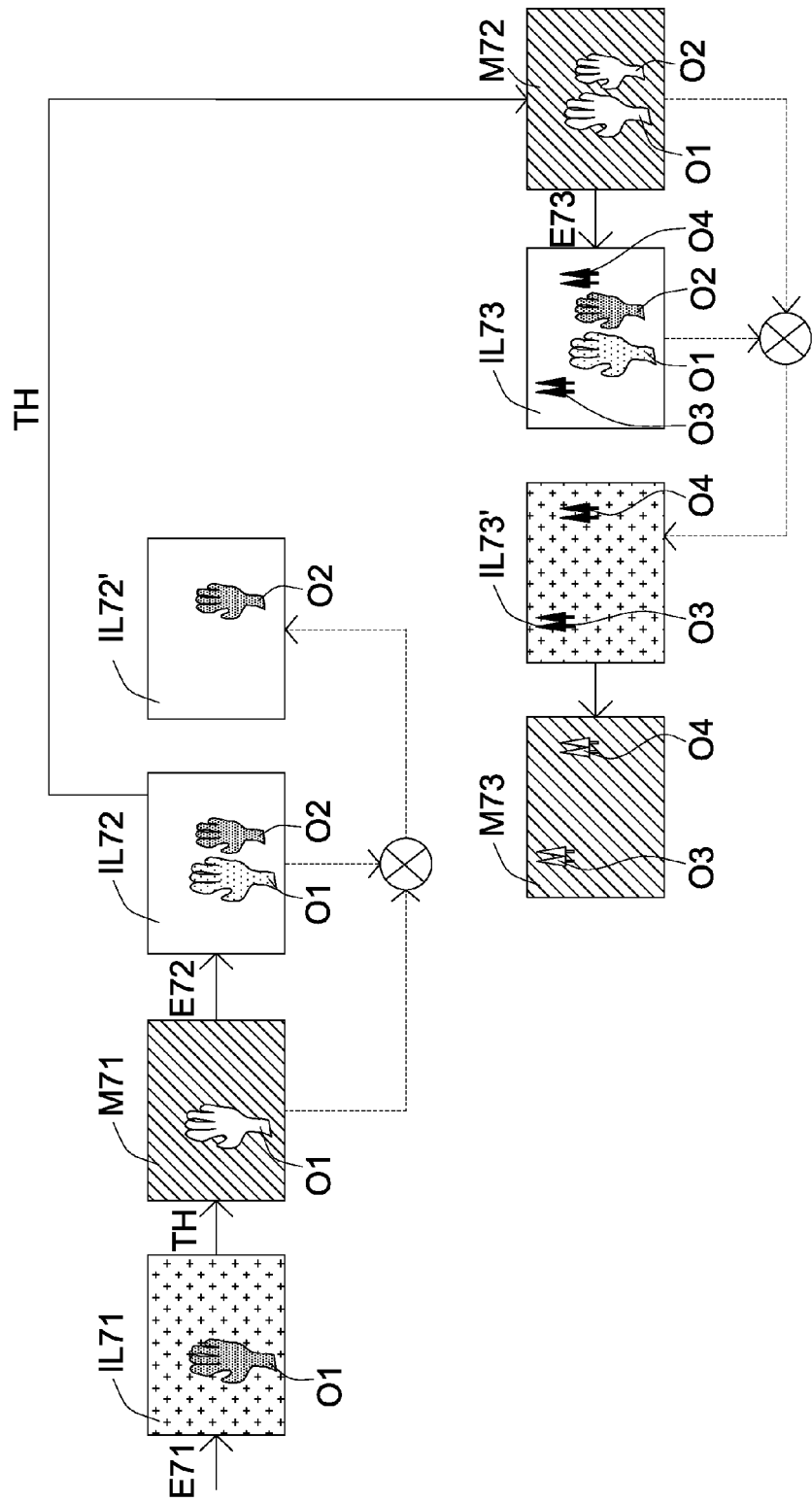
FIG. 8 shows an example of the steps in FIGS. 7A and 7B.

Referring to FIGS. 7A, 7B and 8, FIG. 7A shows a flow chart of another method for depth selective segmentation of an object, FIG. 7B shows a process cycle corresponding to the flow chart of FIG. 7A, and FIG. 8 shows an example of the steps in FIGS. 7A and 7B.

In step S701, the image ILi is captured by the image capturing unit 120 in the invisible domain of the optical spectrum when the scene is illuminated by invisible light illumination unit 110 according to an exposure setting Ei. The exposure setting Ei may comprise of the shutter speed setting, the aperture of the lens, the gain of the sensor; but it is not limited to the aforementioned settings. An image IL71 including the object O1 is captured in the invisible domain of the optical spectrum with an exposure setting E71. By setting the exposure setting E71, only the nearest object O1 will be imaged with a large enough signal to noise ratio, and the other objects O2, O3 and O4 will not be imaged.

In step S702, a binary mask Mi is obtained from the image ILi according to a fixed threshold TH. The binary mask Mi may consist of pixels value of "1" and "0", with "1" being used to preserve regions of interest and "0" used to eliminate other regions of the image. For example, a binary mask M71 is obtained from the image IL71. By setting the suitable threshold TH, a set of objects in the foreground of the scene can be preserved in the binary mask Mi and the background can be filtered out.

In step S703, the exposure setting Ei is changed to an exposure setting Ei+1. In this step, the exposure setting Ei+1 is used for receiving more invisible light. For example, the exposure setting E71 is changed to be an exposure setting E72.

In step S704, another image ILi+1 is captured by the image capturing unit 120 in the invisible domain of the optical spectrum when the scene is illuminated by invisible light illumination unit 110 according to the changed exposure setting Ei+1. For example, an image IL72 is captured according to the changed exposure setting E72. By setting the suitable exposure setting E72, the objects O1 and O2 can be captured and the objects O3 and O4 will not be captured.

In step S705, part of the latest captured image ILi+1 is eliminated by using the binary mask Mi. For example, part of the image IL72 is eliminated by using the binary mask M71 for creating an image IL72' where the object O1 is eliminated and the object O2 is preserved.

Afterwards, the process goes back to step S702. For example, another binary mask M72 is obtained from the image IL72. In one embodiment, another binary mask where only the object O2 is preserved can be obtained from the image IL72'.

Then, in step S703, the exposure setting E72 of the camera is changed to an exposure setting E73 so that the image capturing unit 120 receives more invisible light.

Afterwards, in step S704, an image IL73 is captured in the invisible domain of the optical spectrum according to the new exposure setting E73. By setting the suitable exposure E73, the objects O1 to O4 can be captured.

Then, in step S705, part of the image IL73 is eliminated by using the binary masks M72 to be an image IL73' where the objects O1 and O2 are eliminated and the objects O3 and O4 are preserved. In another embodiment, after obtaining the first image IL72', another binary mask (not shown) where only the object O2 is preserved can be obtained from the first image IL72', and part of the first image IL73 can be eliminated by using the binary masks M71 where only the object O1 is preserved and the binary mask (not shown) only the object O2 is preserved to be the first image IL73' where the objects O1 and O2 are eliminated and the objects O3 and O4 are preserved.

Afterwards, the process goes back to step S702. Another binary mask M73 where only the objects O3 and O4 are preserved is obtained from the eliminated image IL73'.

The process can be terminated at step S706 by testing if the binary mask contains only zeros for example, or contains isolated patches of pixels not relevant to a content of interest in the image. Thus the latest image contains no more part of interest to be eliminated. Parts to be eliminated can be selected based on arbitrary sizes so that only parts larger than a given size are considered of interest, smaller parts are considered as noise.

Based on above, the binary masks Mi having different depths can be obtained by changing the exposure setting Ei.

Figure 9:
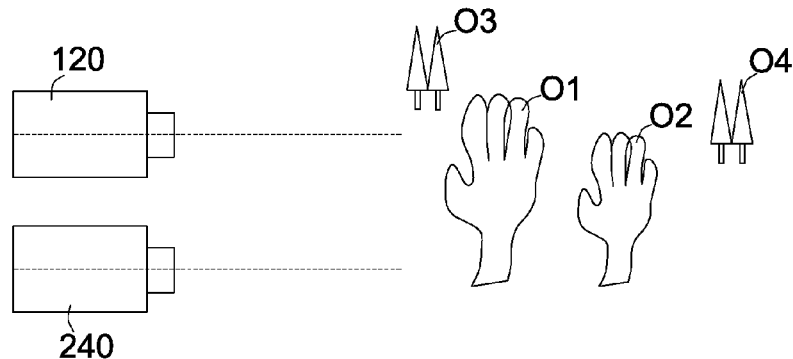
FIG. 9 shows another system for depth selective segmentation of an object.
Figure 10A:
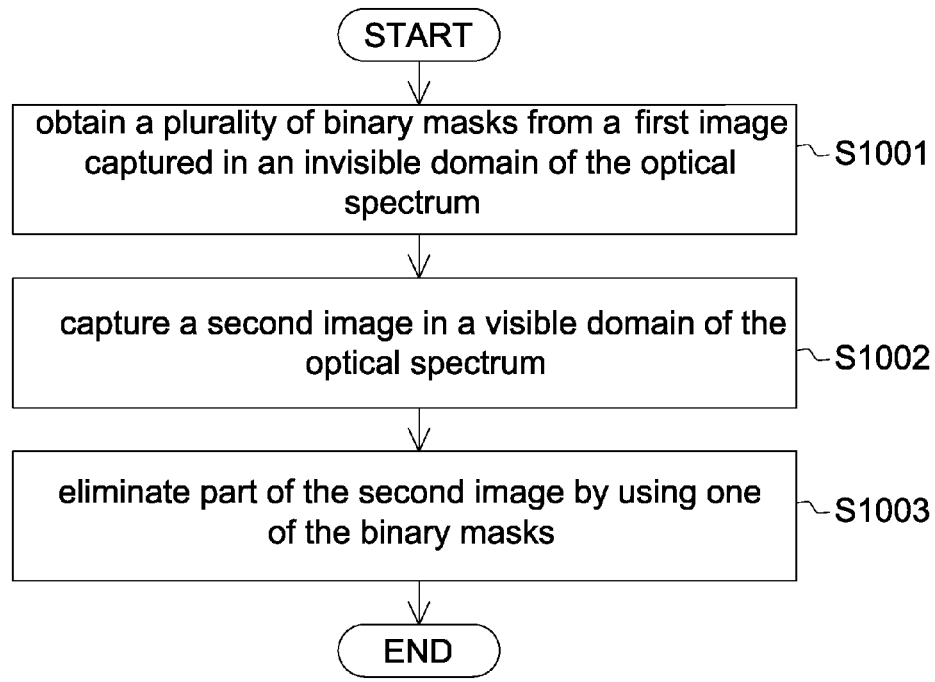
FIG. 10A shows a flow chart of another method for depth selective segmentation of an object.
Figure 10B:
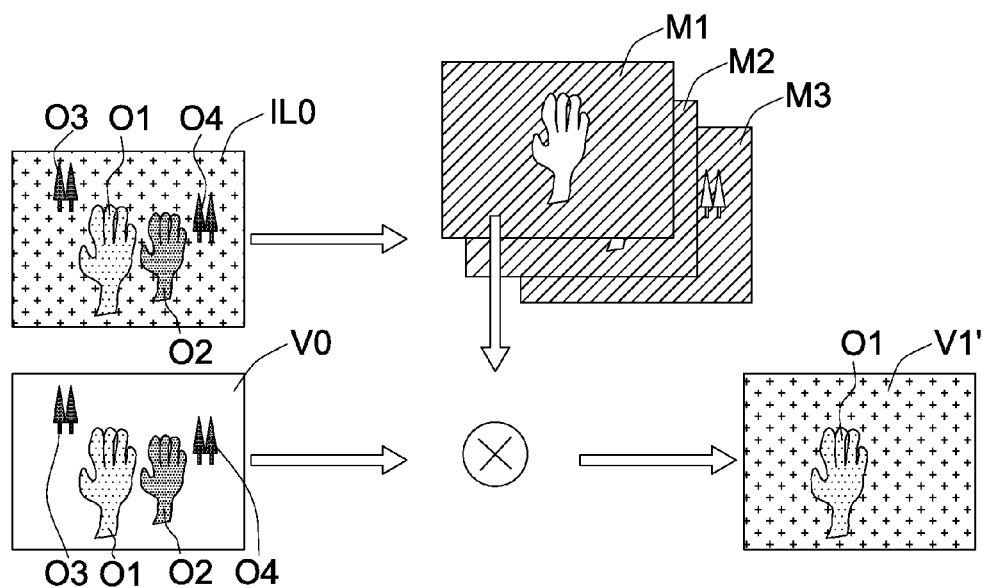
FIG. 10B shows an example of the steps in FIG. 10A.

Referring to FIGS. 9 and 10A and 10B, FIG. 9 shows another system 200 for depth selective segmentation of an object, FIG. 10A shows a flow chart of another method for depth selective segmentation of an object, FIG. 10B shows an example of the steps in FIG. 10A.

The system 200 further comprises an image capturing unit 240 capturing images in the visible domain of the optical spectrum. The image capturing unit 240 is used for capturing an image V0 in the visible domain of the optical spectrum. For example, the image capturing unit 240 may be a camera including a lens module and a sensor. The lens module is used for focusing a reflected visible light on the sensor. The sensor is used for sensing the intensity of the reflected visible light.

The image capturing unit 120 and the image capturing unit 240 can be two separate cameras located next to each other at a given known distance, one camera capturing images in the visible domain of the optical spectrum and the other camera capturing images in the invisible domain of the optical spectrum. If a mismatch between the images captured by the two cameras occurs, such mismatch can be compensated by rectifying the image captured in the visible domain of the optical spectrum or the image captured in the invisible domain of the optical spectrum or both images. The rectification operation can be a registration. The registration can be performed for example after computing the disparity between reference points, which may be done during a calibration phase. The two cameras can possess similar lenses and imaging properties so that an object of a given size is imaged by a proportionally identical number of pixels.

In step S1001, a plurality of binary masks M1, M2, M3 are obtained from the image IL0 captured in the invisible domain of the optical spectrum. In this step, the binary masks M1, M2, M3 can be obtained by the steps in FIG. 3A, FIG. 5A or FIG. 7A.

In step S1002, the image V0 is captured by the image capturing unit 240.

In step S1003, part of the image V0 is eliminated by at least one of the binary masks M1, M2, M3. For example, the objects O2, O3 and O4 of the image V0 are eliminated by using the binary masks M2 and M3, resulting in a segmented image V1'.

Figure 11:
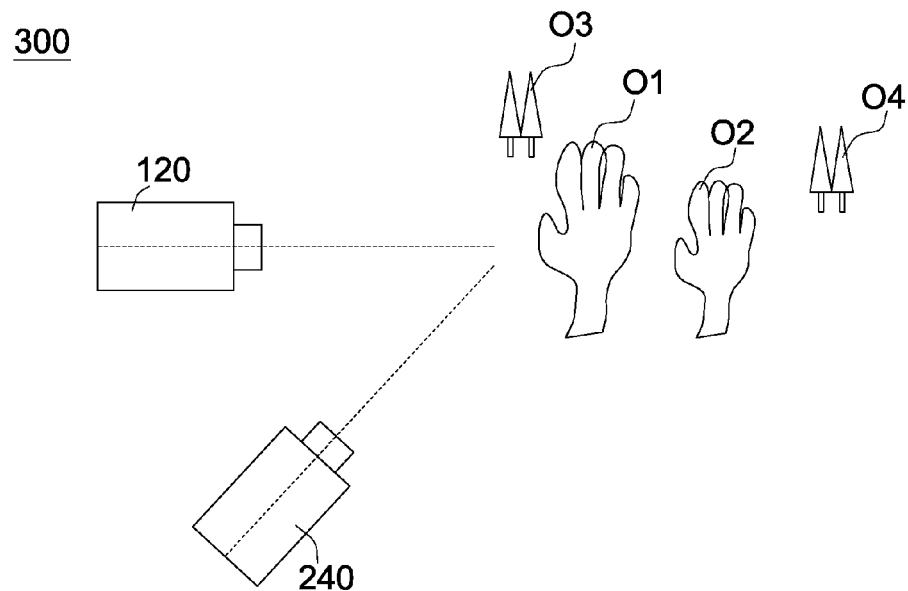
FIG. 11 shows another system for depth selective segmentation of an object.
Figure 12:
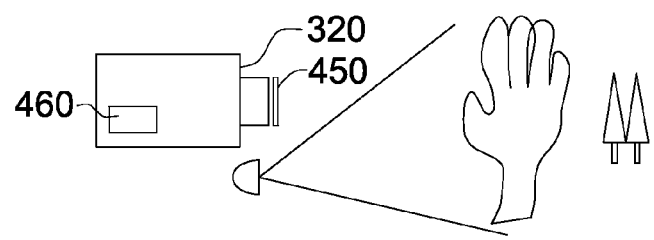
FIG. 12 shows another system for depth selective segmentation of an object.
Figure 13:
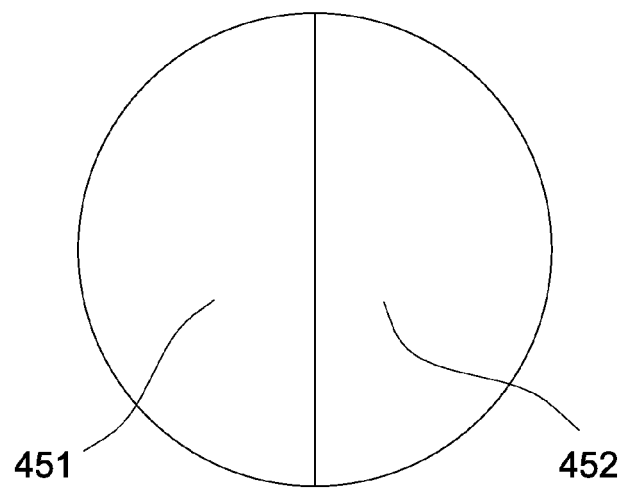
FIGS. 13 to 15 respectively show examples of combination of invisible light pass filter with visible light pass filter.
Figure 14:
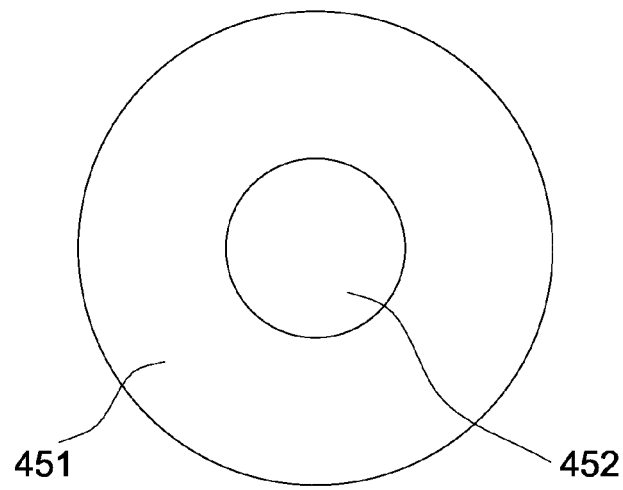
Figure 15:
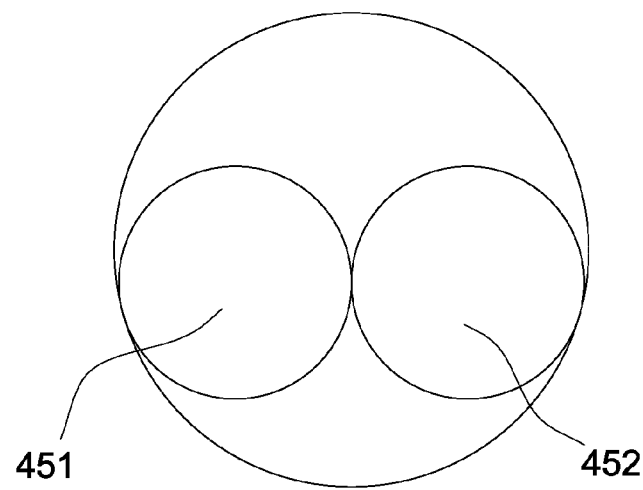

Referring to FIG. 11, FIG. 11 shows another system 300 for depth selective segmentation of an object. In one embodiment, the image capturing unit 120 capturing images in an invisible domain of the optical spectrum and the image capturing unit 240 can be two separate cameras disposed so that their optical axis converges to a point. Referring to FIGS. 12 to 15, FIG. 12 shows another system 400 for depth selective segmentation of an object, and FIGS. 13 to 15 respectively show examples of optical filters 450, resulting in the combination of invisible light pass filter 451 with visible light pass filter 452. In one embodiment, a single sensor 460 integrates sensing elements sensitive to the invisible domain of the optical spectrum as used previously and sensing elements sensitive to visible light. The optical filter 450 is located in front of camera unit 320. Referring to FIG. 13, the invisible light pass filter 451 and the visible light pass filter 452 can be two semicircles. Referring to FIG. 14, the visible light pass filter 452 can surround the invisible light pass filter 451. Referring to FIG. 15, the invisible light pass filter 451 and the visible light pass filter 452 can be two apertures located side by side.

Figure 16:
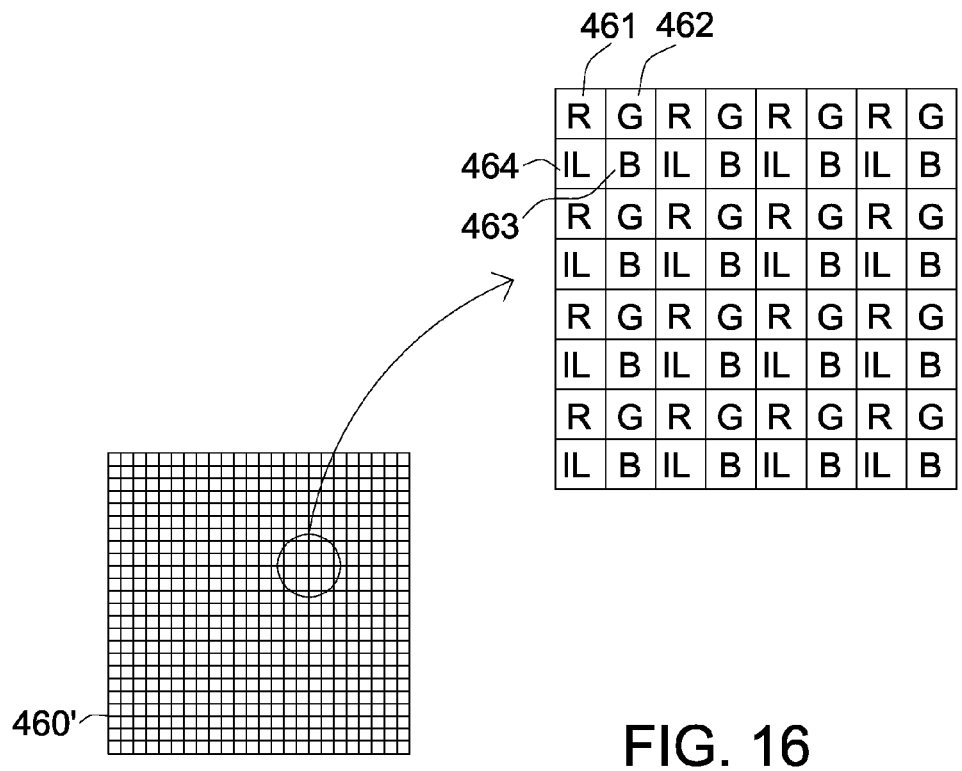
FIG. 16 shows a sensor of the camera in FIG. 12.

Other relative disposition or shape of the invisible and visible light pass filter can be derived from the previous examples. FIG. 16 illustrates sensor of the camera unit 320 in FIG. 12. In one embodiment, the camera unit 320 can include a hybrid sensor 460' having a plurality of red light pixels 461, a plurality of green light pixels 462, a plurality of blue light pixels 463 and a plurality of invisible light pixels 464.

The red light pixels 461, the green light pixels 462 and the blue light pixels 463 are used to capture the image V0 in the visible domain of the optical spectrum, and the invisible light pixels 464 are used to capture the image IL0 in the invisible domain of the optical spectrum. Because the resolution of the image V0 and the image IL0 are different, the method for depth selective segmentation of the object further includes a step of resizing the image IL0 or the image V0, such that the size of the image IL0 is identical to that of the image V0.

The advantage of using the hybrid sensor with the present disclosure is that when doing a matting operation, binary mask obtained from the image captured in the invisible domain of the optical spectrum is collocated with that of the image captured in the visible domain of the optical spectrum.

Figure 17:
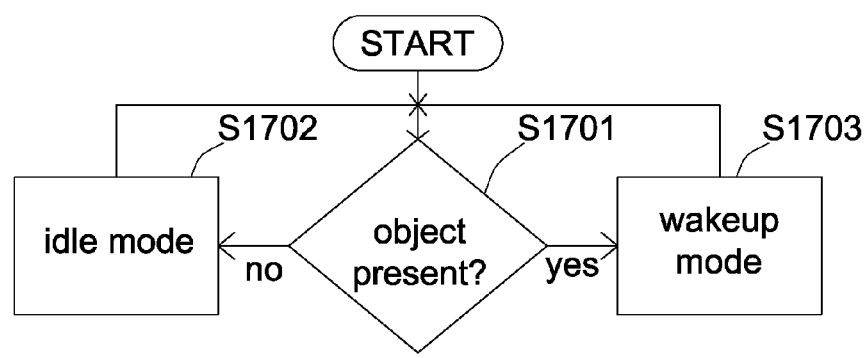
FIG. 17 shows a flowchart of a power control method.

Referring to FIG. 17, a flowchart of a power control method is shown. In step S1701, the processing unit 130 detects whether an object is present or not. If an object is not present, then the process proceeds to step S1702; if the object is present, then the process proceeds to step S1703.

In step S1702, the processing unit 130 controls the invisible light illumination unit 110 to be in an idle mode, where the power consumption is substantially reduced, by the use of a low repetition rate PWM (pulse width modulation) for example.

In step S1703, the processing unit 130 controls the invisible light illumination unit 110 to be in a wakeup mode for capturing the image IL0 in the invisible domain of the optical spectrum and performing for example a depth selective segmentation.

Figure 18:
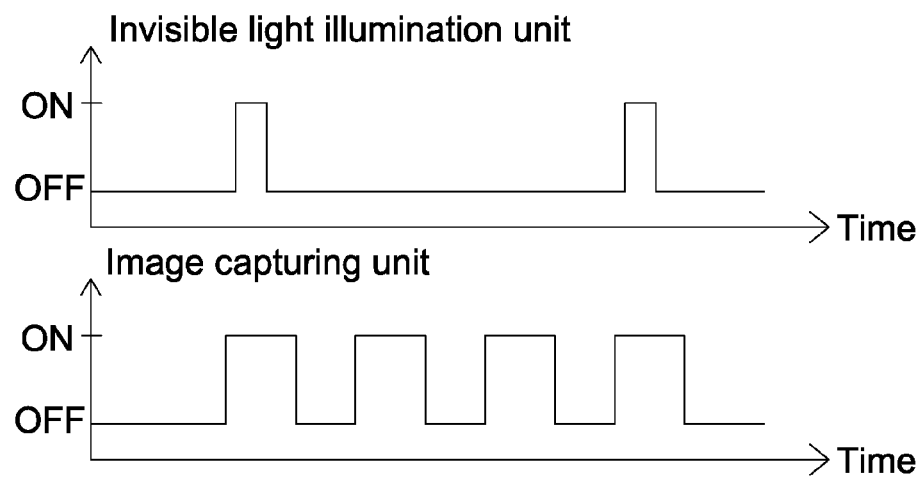
FIG. 18 shows an example of controlling an invisible light illumination unit and an image capturing unit in the idle mode.
Figure 19:
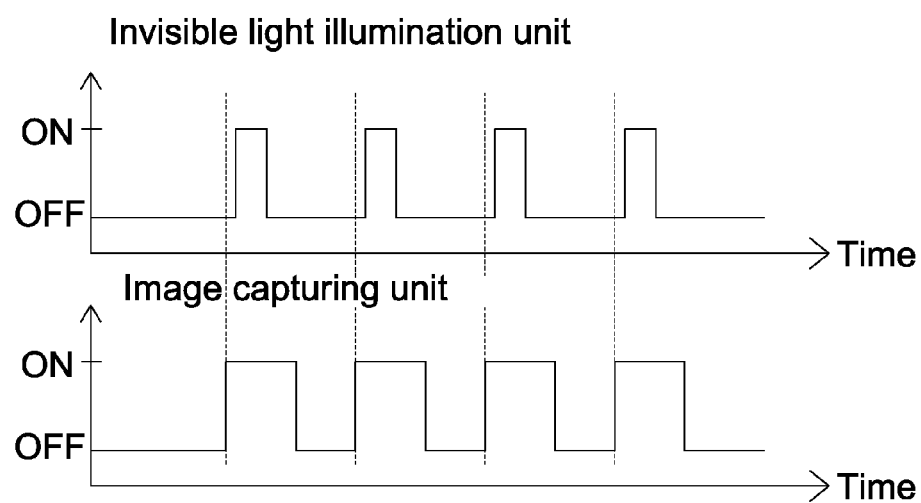
FIG. 19 shows an example of controlling the invisible light illumination unit and the image capturing unit in the wakeup mode.

Referring to FIGS. 18 and 19, FIG. 18 shows an example of controlling the invisible light illumination unit 110 and an image capturing unit in the idle mode, and FIG. 19 shows an example of controlling the invisible light illumination unit 110 and the image capturing unit in the wakeup mode. The image capturing unit can be image capturing unit 120, or the combination of image capturing unit 120 and image capturing unit 240. A flash rate of the invisible light provided by the invisible light illumination unit 110 in the idle mode is lower than that in the wakeup mode. In the idle mode, the invisible light is used for detecting whether an object is present or not. In the wakeup mode, the invisible light is not only used to detect whether the object is present or not, but also used to perform a depth selective segmentation for example.

Figure 20:
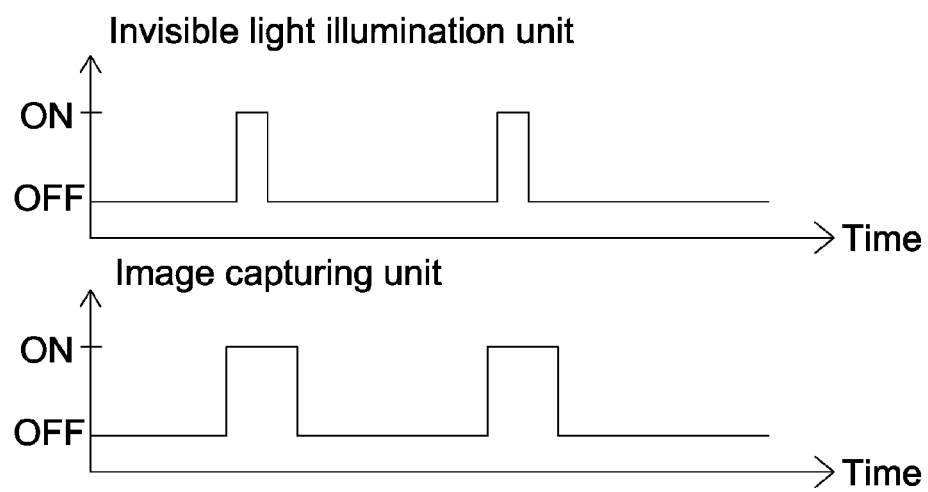
FIG. 20 shows another example of controlling the invisible light illumination unit and the image capturing unit in the idle mode.
Figure 21:
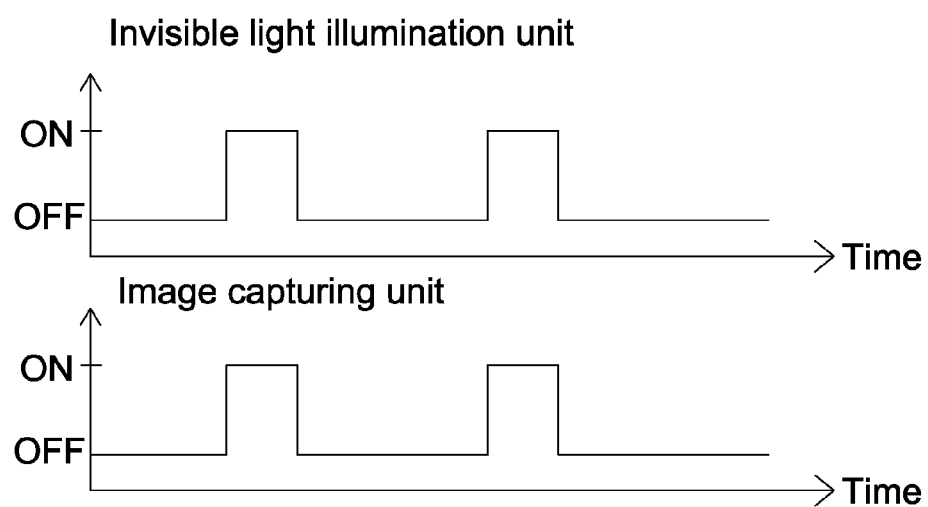
FIG. 21 shows another example of controlling the invisible light illumination unit and the image capturing unit in the wakeup mode.

Referring to FIGS. 20 and 21, FIG. 20 shows another example of controlling the invisible light illumination unit 110 and the image capturing unit in the idle mode, and FIG. 21 shows another example of controlling the invisible light illumination unit 110 and the image capturing unit in the wakeup mode. A duty cycle of the invisible light provided by the invisible light illumination unit 110 in the idle mode is lower than that in the wakeup mode.

Based on the above power control method, when the object is not present, the power consumption of the unit is reduced. When an object appears in the field of view of the image capturing unit, a depth selective segmentation can be performed.

The power of the illumination unit can also be controlled according to the distance of the object, more power being required when the object is further away. FIG. 20 can illustrate such a case, with FIG. 20 illustrating the case when the object is close, with a low duty cycle for the invisible light illumination unit and FIG. 21 illustrating the case when the object is far, with a higher duty cycle for increasing the power of the illumination unit.

Figure 22:
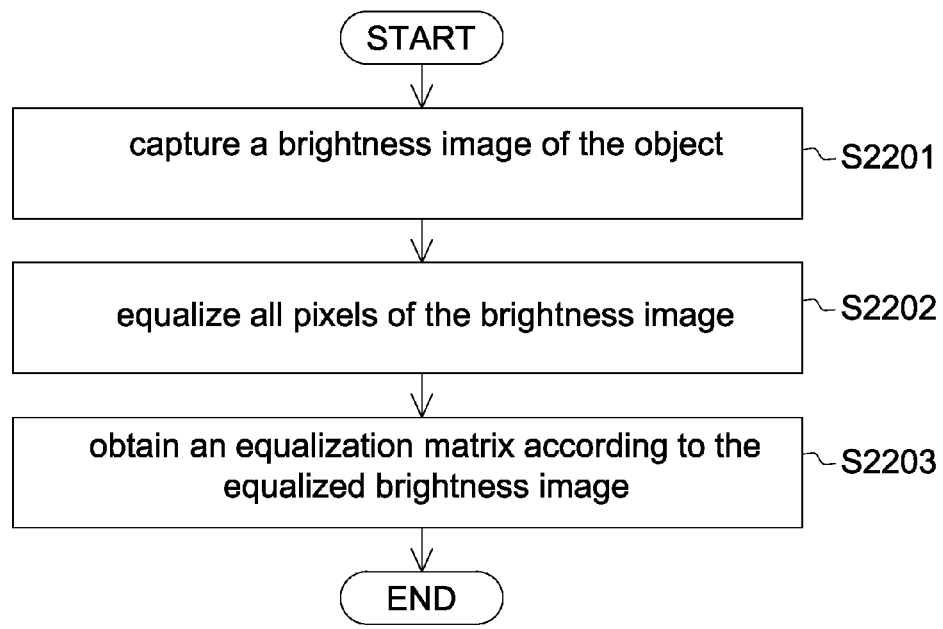
FIG. 22 shows a flowchart of a method for calibrating an uneven illumination of the invisible light illumination unit.

Referring to FIG. 22, a flowchart of a method for calibrating the lack of uniformity of the light of the invisible light illumination unit.

In step S2201, the image capturing unit 120 captures one or a plurality of brightness images in an invisible domain of the optical spectrum of a uniformly reflecting object such as a sheet of white diffusing paper. The image is captured under the illumination condition provided by the invisible light illumination unit 110.

In steps S2202, all pixels of the one or a plurality of the captured images are equalized by the processing unit 130.

In step S2203, an equalization matrix is obtained according to the equalized image.

After obtaining the equalization matrix, when performing one or more of the steps S301, S501, S701 of capturing the image ILi in the invisible domain of the optical spectrum, the image ILi is calibrated according to the equalization matrix by the processing unit 130.

It will be apparent to those skilled in the art that various modifications and variations can be made to the disclosed embodiments. It is intended that the specification and examples be considered as exemplary only, with a true scope of the disclosure being indicated by the following claims.

What is claimed is:

1. A method for depth selective segmentation of an object, comprising:
   capturing an image in an invisible domain of the optical spectrum by illuminating a scene of interest under an illumination provided in said invisible domain of the optical spectrum by an invisible light illumination unit;
   obtaining a binary mask from the captured image according to a threshold;
   eliminating part of the captured image by applying the binary mask to the captured image, and resulting in a new image;
   changing the threshold and obtaining another binary mask; and
   applying the latest obtained binary mask to the captured image;
   wherein the step of changing the threshold, the step of obtaining a mask and the step of applying the latest obtained binary mask to the captured image are repeatedly performed based on the same captured image until all required parts of the captured image are eliminated.

2. The method for depth selective segmentation of the object according to claim 1, wherein the invisible domain of the optical spectrum corresponds to an ultra violet light, an infrared light or a mix of infrared light and UV light.

3. The method for depth selective segmentation of the object according to claim 1, further comprising:
   capturing an image in a visible domain of the optical spectrum; and
   eliminating part of the image captured in the visible domain of the optical spectrum by applying one of the binary masks to the image captured in the visible domain.

4. The method for depth selective segmentation of the object according to claim 3, wherein
   in the step of capturing the image in the invisible domain of the optical spectrum and the step of capturing the image in the visible domain of the optical spectrum, the image captured in the invisible domain of the optical spectrum and the image captured in the visible domain of the optical spectrum are captured by two separate cameras;
   the two separate cameras are respectively placed so that their optical axis are parallel; and
   the image captured in the invisible domain of the optical spectrum is registered to the image captured in the visible domain of the optical spectrum or the image captured in the visible domain of the optical spectrum is registered to the image captured in the invisible domain of the optical spectrum.

5. The method for depth selective segmentation of the object according to claim 3, wherein
   in the step of capturing the image in the invisible domain of the optical spectrum and the step of capturing the image in the visible domain of the optical spectrum, the image captured in the invisible domain of the optical spectrum and the image captured in the visible domain of the optical spectrum are captured by two separate cameras;
   the two separate cameras are respectively placed so that their optical axis converge to a point; and
   the image captured in the invisible domain of the optical spectrum is registered to the image captured in the visible domain of the optical spectrum or the image captured in the visible domain of the optical spectrum is registered to the image captured in the invisible domain of the optical spectrum.

6. The method for depth selective segmentation of the object according to claim 3, wherein
   in the step of capturing the image in the invisible domain of the optical spectrum and the step of capturing the image in the visible domain of the optical spectrum, the image captured in the invisible domain of the optical spectrum and the image captured in the visible domain of the optical spectrum are captured by one camera; and
   the camera includes an invisible light pass filter for transmitting the light of the invisible domain of the optical spectrum to capture the image in the invisible domain of the optical spectrum and a visible light pass filter for transmitting the light of the visible domain of the optical spectrum to capture the image in the visible domain of the optical spectrum.

7. The method for depth selective segmentation of the object according to claim 3, wherein in the step of capturing the image in the invisible domain of the optical spectrum and the step of capturing the image in the visible domain of the optical spectrum, the image captured in the invisible domain of the optical spectrum and the image captured in the visible domain of the optical spectrum are captured by one camera the camera includes a sensor having a plurality of pixels sensitive to red light, a plurality of pixels sensitive to green light, a plurality of pixels sensitive to blue light and a plurality of pixels sensitive to the invisible domain of the optical spectrum; and the method further comprises:

resizing the image captured in the invisible domain of the optical spectrum or the image captured in the visible domain of the optical spectrum, such that the size of the image captured in the invisible domain of the optical spectrum and the size of the image captured in the visible domain of the optical spectrum are identical.

8. The method for depth selective segmentation of the object according to claim 1, further comprising:

detecting whether the object is present or not;

controlling the invisible light illumination unit to be in an idle mode, if the object is not present; and controlling the invisible light illumination unit to be in a wakeup mode, if the object is present;

wherein a flash rate of the invisible light illumination unit in the idle mode is lower than that in the wakeup mode.

9. The method for depth selective segmentation of the object according to claim 1, further comprising:

detecting whether the object is present or not;

controlling the invisible light illumination unit to be in an idle mode, if the object is not present; and controlling the invisible light illumination unit to be in a wakeup mode, if the object is present;

wherein a duty cycle of the invisible light illumination unit in the idle mode is lower than that in the wakeup mode.

10. The method for depth selective segmentation of the object according to claim 1, further comprising:

capturing a brightness image of a uniformly reflecting object under the illumination provided by the invisible light illumination unit;

equalizing all pixels of the brightness image; and obtaining an equalization matrix according to the equalized brightness image;

wherein in the step of capturing the image in the invisible domain of the optical spectrum, the image captured in the invisible domain of the optical spectrum is calibrated according to the equalization matrix.

11. A system for depth selective segmentation of an object, comprising:

an invisible light illumination unit;

an image capturing unit, capable of capturing an image in an invisible domain of the optical spectrum; and a processing unit, used for obtaining a binary mask from the image captured in the invisible domain of the optical spectrum according to a threshold;

wherein the processing unit eliminates part of the image captured in the invisible domain of the optical spectrum by applying the binary mask to result in a new image;

the processing unit further changes the threshold and obtains another binary mask from the captured image according to the changed threshold; and the processing unit repeatedly: obtains a binary mask, eliminates part of the captured image with the latest obtained binary mask and changes the threshold based on the same captured image until all required parts of the image are eliminated.

12. The system for depth selective segmentation of the object according to claim 11, wherein the invisible domain of the optical spectrum corresponds to an ultra violet light, an infrared light or a mix of infrared light and UV light.

13. The system for depth selective segmentation of the object according to claim 11, further comprising:

an image capturing unit capable of capturing an image in a visible domain of the optical spectrum;

wherein the processing unit eliminates part of the image captured in the visible domain of the optical spectrum by applying one of the binary masks to the image captured in the visible domain of the optical spectrum.

14. The system for depth selective segmentation of the object according to claim 13, wherein the image capturing unit capable of capturing an image in a visible domain of the optical spectrum and the image capturing unit capable of capturing an image in an invisible domain of the optical spectrum are two separate cameras; and the image capturing unit capable of capturing an image in a visible domain of the optical spectrum and the image capturing unit capable of capturing an image in an invisible domain of the optical spectrum are respectively located so that their optical axis are parallel.

15. The system for depth selective segmentation of the object according to claim 13, wherein the image capturing unit capable of capturing an image in a visible domain of the optical spectrum and the image capturing unit capable of capturing an image in an invisible domain of the optical spectrum are two separate cameras; and the image capturing unit capable of capturing an image in a visible domain of the optical spectrum and the image capturing unit capable of capturing an image in an invisible domain of the optical spectrum are respectively located so that their optical axes converge to a point.

16. The system for depth selective segmentation of the object according to claim 13, wherein the image capturing unit capable of capturing an image in a visible domain of the optical spectrum and the image capturing unit capable of capturing an image in an invisible domain of the optical spectrum are integrated into one camera.

17. The system for depth selective segmentation of the object according to claim 16, wherein the camera includes an invisible light pass filter for transmitting the light of the invisible domain of the optical spectrum and a visible light pass filter for transmitting the light of the visible domain of the optical spectrum.

18. The system for depth selective segmentation of the object according to claim 16, wherein the camera includes a sensor having a plurality of pixels sensitive to red light, a plurality of pixels sensitive to green light, a plurality of pixels sensitive to blue light and a plurality of pixels sensitive to the invisible domain of the optical spectrum; and the processing unit resizes the image captured in the invisible domain of the optical spectrum or the image captured in the visible domain of the optical spectrum, such that the size of the image captured in the visible domain of the optical spectrum and the size of the image captured in the invisible domain of the optical spectrum are identical.

19. The system for depth selective segmentation of the object according to claim 11, wherein
the processing unit detects whether the object is present or not; controls the invisible light illumination unit to be in an idle mode if the object is not present; and controls the invisible light illumination unit to be in a wakeup mode if the object is present; and
wherein a flash rate of the invisible light illumination unit in the idle mode is lower than that in the wakeup mode.

20. The system for depth selective segmentation of the object according to claim 11, wherein
the processing unit detects whether the object is present or not; controls the invisible light illumination unit to be in an idle mode if the object is not present; and controls the invisible light illumination unit to be in a wakeup mode if the object is present; and
a duty cycle of the invisible light illumination unit in the idle mode is lower than that in the wakeup mode.

21. The system for depth selective segmentation of the object according to claim 11, wherein the image capturing unit capable of capturing an image in an invisible domain of the optical spectrum further captures a brightness image of an uniformly reflecting object under the illumination provided by the invisible light illumination unit; and the processing unit further equalizes all pixels of the brightness image, obtains an equalization matrix according to the equalized brightness image, and calibrates the image captured in the invisible domain of the optical spectrum according to the equalization matrix.

22. The system for depth selective segmentation of the object according to claim 11, wherein:
the image capturing unit captures an image in an invisible domain of the optical spectrum according to an exposure setting; and
the processing unit changes the light intensity or the exposure setting;
wherein the image capturing unit captures another image in the invisible domain of the optical spectrum according to the changed light intensity or the changed exposure setting, and the processing unit eliminates part of the latest image captured in the invisible domain of the optical spectrum by using the latest binary mask, resulting in an image with the eliminated part, and obtains at least another binary mask from the image with the eliminated part.

* * * * *